Aug. 27, 1929.  F. W. GAY  1,725,906
HEAT TRANSFER MEANS
Filed July 5, 1927  2 Sheets-Sheet 1
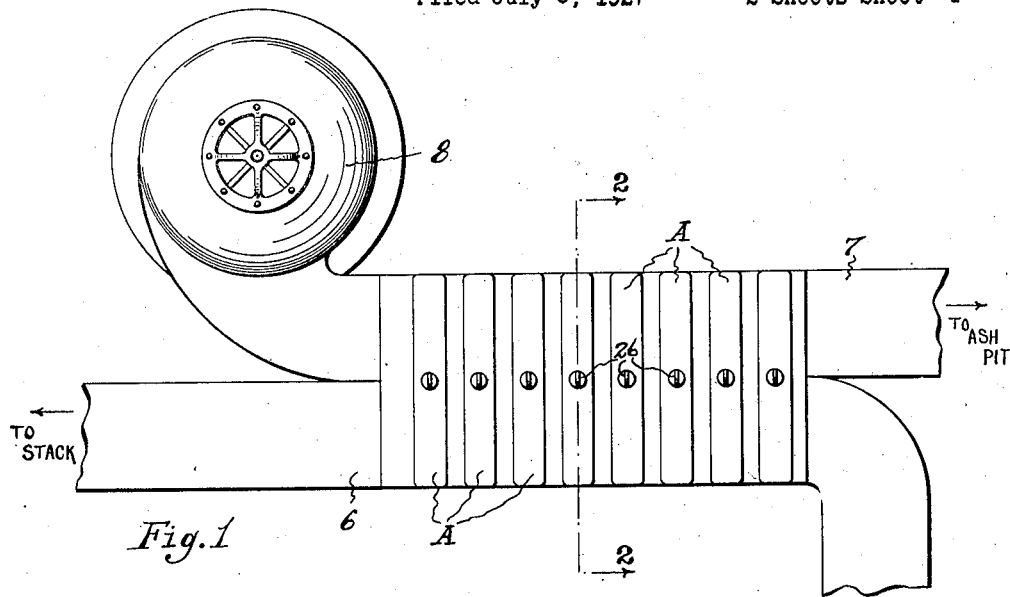
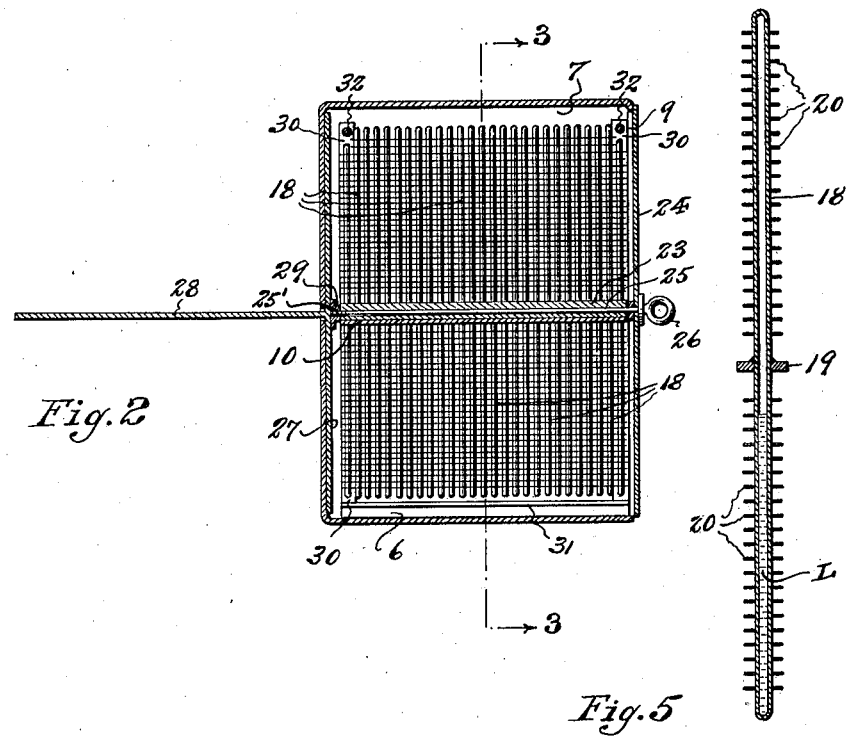
INVENTOR.
Frazer W. Gay,
BY
George D. Richards
ATTORNEYS.

Aug. 27, 1929.  F. W. GAY  1,725,906
HEAT TRANSFER MEANS
Filed July 5, 1927   2 Sheets-Sheet 2

INVENTOR.
Frazer W. Gay,
BY
George D. Richards
ATTORNEYS.

Patented Aug. 27, 1929.

1,725,906

UNITED STATES PATENT OFFICE.

FRAZER W. GAY, OF NEWARK, NEW JERSEY.

HEAT TRANSFER MEANS.

Application filed July 5, 1927. Serial No. 203,380.

This invention relates, generally, to a novel contact device for transferring heat from one fluid body to another.

This invention has for its principal object to provide a novel form of heat transfer device wherein a closed tubular element is provided within one end with a volatile liquid which, under influence of heat conducted thereto through such end, is caused to boil and yield a hot vapor adapted to rise to the opposite end of the tube at which point the heat is radiated to condense the vapor for gravitation back to the lower end of the tube. When the heat transfer device so characterized is placed in contact at its lower end with a hot fluid heat is extracted thereby from said fluid and transferred by radiation at its upper end to a fluid in contact with the latter. The heat transfer device is therefore, in its broad aspects, capable of use in many ways, either to dissipate heat from a hot fluid to be cooled or to heat a cool fluid by heat extracted from a hot fluid.

In a more limited aspect this invention has for a more specific object to provide a novel heat transfer means adapted to take up heat from the gases of combustion discharged from a furnace through a stack or other conduit and transfer the same to the air delivered through an adjacent conduit to the furnace fire-box, whereby said air is preheated to increase the efficiency of fuel combustion within the furnace.

The invention also has for an object to provide a novel construction and arrangement of heat transfer means which is readily removable from operative relation to the outgoing gas and ingoing air conduits, so that the same may be easily kept clean and in efficient operating condition; and the invention has for a further object to provide a novel form of heat transfer means comprising an arrangement of elements in the form of sealed tubes containing a volatile liquid, said tubes having their lower ends in contact with the outgoing hot stack gases and their upper ends in contact with ingoing air, so that said volatile liquid boils in the lower ends of the tubes under the influence of the heat of the stack gases to produce a hot vapor which rises to the upper ends of the tubes, the heat thus carried to the upper tube-ends being radiated therefrom to the air, and such transfer of heat operating to cool and condense said vapor for return to the lower tube-ends, so that the cycle of heat transfer operations thus produced is continuously repeated.

Other objects of this invention, not as this time more particularly enumerated, will be clearly understood from the following detailed description of the same.

One embodiment of this invention illustrating the principles and novel features thereof is shown in the accompanying drawings, in which:—

Figure 1 is a side view of an ingoing air conduit and outgoing gas discharge conduit arranged to receive and shown equipped with the novel heat transfer apparatus of this invention;

Figure 2 is an enlarged cross-sectional view, taken on line 2—2 in said Figure 1;

Figure 5 is a detail view, in longitudinal section, of one of the tubular heat transfer devices with which each unit is provided.

Similar characters of reference are employed in all of the hereinabove described views, to indicate corresponding parts.

Figure 3:
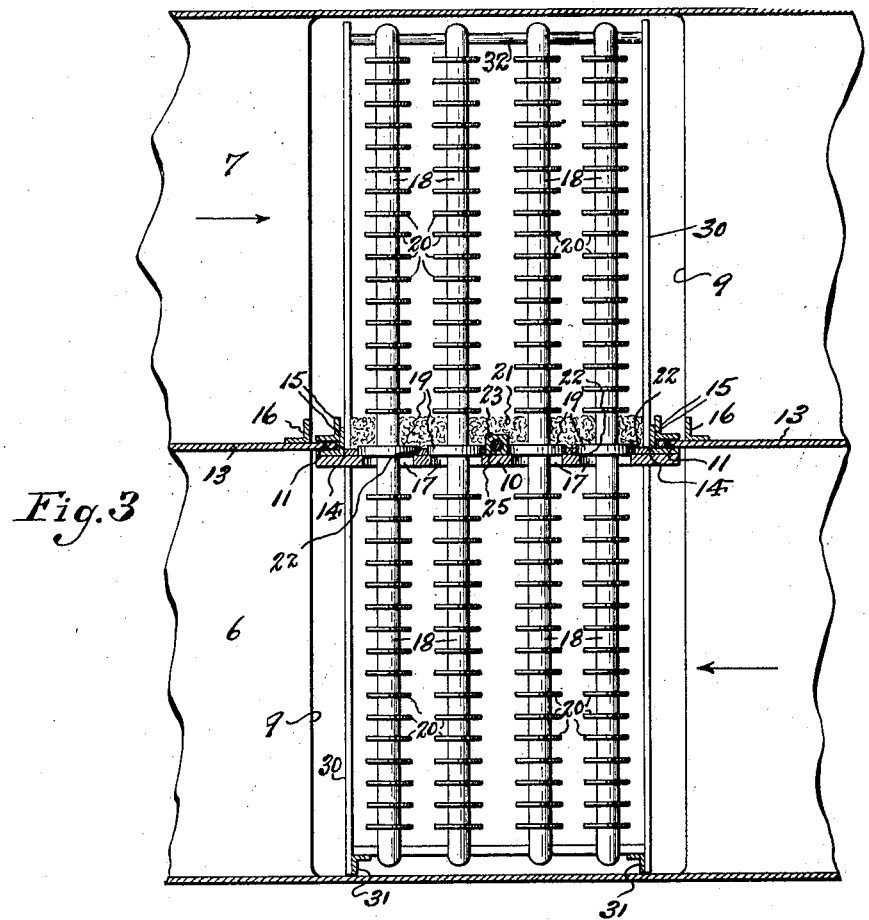
Figure 3 is a still further enlarged fragmentary view in longitudinal section, taken on line 3—3 in said Figure 2.
Figure 4:
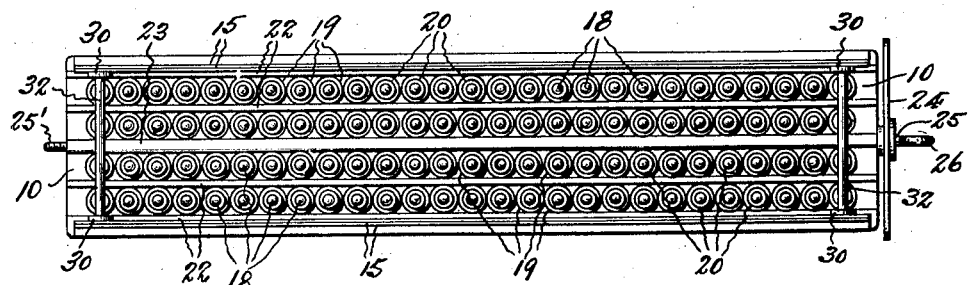
Figure 4 is a top end view of a removable heat-transfer unit, made according to and embodying the principles of this invention.

In said drawings, the reference character 6 indicates the outgoing conduit through which the hot gases of combustion discharged from a furnace are delivered to the stack, and 7 indicates the ingoing conduit through which air is delivered to the fire-box of the furnace in support of the combustion of fuel therein. Throughout a portion of their length, said conduits 6 and 7 are disposed in side by side parallel and adjoining relation, to provide a zone in which the novel heat transfer devices may be located and arranged. It is preferable, although not in every case necessary, to provide at the intake end of said air conduit a force draft blower 8 of some suitable form.

The adjoining sections of said conduits 6 and 7 are provided with a plurality of suitably spaced removable heat transfer units A, as shown in Figure 1, the details of which will be presently described, and which are so disposed as to cross the interiors of the respective conduits; the said conduits being provided with suitable openings 9 (see Figures 2 and 3) through which said units may be passed into operative relation to the conduit interiors.

Each heat transfer unit A comprises a body-plate or supporting panel 10, which is provided along its longitudinal margins with means to provide channeled guideways 11 to receive the transverse marginal portions of the partition wall 13 intermediate the conduits 6 and 7, which marginal portions bound an opening 14 in said partition wall through which the heat transfer unit A extends. Said channeled guideways 11 may be formed by securing properly angle-irons 15 to the body-plate 10, or may be otherwise produced in any convenient or suitable manner. In order to stiffen and reinforce the intermediate partition wall 13 adjacent to the openings 14 through which the heat transfer units are disposed, transverse angle-irons 16, or other suitable form of bracing may be employed.

The body-plate 10 is provided substantially throughout its length with parallel rows of openings 17 through which may extend the tubular heat transfer elements of the unit A, whereby a considerable number of said tubular elements are mounted in spaced apart relation in connection with each said unit, and in such manner that, when the body-plate 10 is slid into place across the opening 14 of the partition wall 13, the lower ends of said elements will project downwardly into the interior of said conduit 6 in the path of and so as to contact with the outgoing stream of hot gases of combustion flowing therethrough, while the upper ends of said elements will project upwardly into the interior of said conduit 7 in the path of and so as to contact with the ingoing stream of air flowing therethrough to the fire-box of the furnace via the ash-pit of the latter.

The said tubular elements individually comprise a tube member 18 closed at its opposite ends, the same having secured thereto, intermediate its ends, and preferably by welding, a laterally projecting exterior supporting flange 19 of dimensions greater than the dimensions of the openings 17 of the body-plate 10 through which the tubes extend; so that said flanges may thus rest on the upper surface of said body-plate 10 in such manner that, when the body-plate is disposed between the adjoining sections of the conduits 7 and 6, the upper ends extend into the conduit 7 and the lower ends into the conduit 6, as above explained. The tube-members 18 are preferably made of a non-corrosible metal, such as nicrome, or at least the lower ends of the same, which are exposed to the hot stack gases are preferably made of such non-corrosible metal. In order that the lower ends of said tube members may more readily receive and take up heat through the walls of their lower ends, and also more readily radiate heat through the walls of their upper ends, such portions of the tubes are provided with longitudinally spaced annular exterior fins 20, which provide increased contact surface both with the hot gases from which heat is taken and with cool gases or air to which heat is to be transferred. The lower end portion of each tube-member 18 is filled with a volatile liquid L such as mythal alcohol, water, mercury, etc., according to the boiling efficiency desired.

After the tube members 18 are assembled in place relative to the body-plate 10, a layer of a suitable packing material 21, such as asbestos wool, is packed around the tubes over the upper surface of said body-plate 10 so as to be interposed between the conduits 6 and 7 to prevent gas leakage through the plate openings 17.

In order to prevent lateral displacement of the tube members 18, from operative assembled relation to the body-plate 10, the latter may be provided on its upper surface with stops 22 of suitable form to engage the margins of the supporting flanges 19 of said tube members.

The body-plate of each heat transfer unit A is provided with a central longitudinal rib 23 having a longitudinal passage therethrough. In order to close the openings 9 in the conduits, through which the heat transfer units A are inserted when operatively assembled with the latter, each unit includes an exterior cover-plate 24. This cover-plate 24 is held in place by a keeper-bolt 25 which extends therethrough, and which is provided at its exterior end with a manipulating and pull ring 26. In order to both close the side opening 9 of the conduits, and also interpose a temporary partition plate across the opening 14 in the intermediate partition wall 13, when the heat transfer unit is removed from the conduits, I provide a separable interior cover-plate 27, having suitably attached thereto a horizontal partition plate 28. Said interior cover-plate 27 is provided with a suitably located internally threaded socket-member 29 for opposition to the inner end of said keeper-bolt 25, and so that when the heat transfer unit is in place, the inner screw-threaded end 25' of said keeper-bolt may be engaged in said socket member 29, as shown more especially in Figure 2 of the drawings. By the arrangement thus provided, when the heat transfer unit A is withdrawn out of the conduits, the interior cover-plate 27 is drawn outwardly therewith until it abuts and closes the opening 9, and, at the same time, the temporary partition-plate 28 is drawn across the opening 14 between the conduit passages 6 and 7. As shown as the interior cover-plate 27 reaches its closing position, the operator, by turning the keeper-bolt 25 to unscrew the threaded end 25' thereof from the socket-member 29, thus disconnects the unit therefrom. These operations are reversed when replacing the units in operative relation to the conduits.

In order to stiffen each unit A and also provide means to facilitate handling of the same when inserting or removing the same from operative assembled relation to the conduits 6—7, I may provide each unit with side frame members 30, having connected at their lower ends longitudinally extending angle-irons 31 to form foot-pieces, and having between laterally opposite side frame members 30, and at the upper ends thereof transverse hand-grip bars 32.

As indicated in Figure 1 a number of units A are inserted across the adjoining sections of the conduits 6 and 7, so as to dispose the heat transfer tubes in operative relation to said respective conduits. As the hot gases of combustion are discharged from the furnace into the conduit 6, the same will flow outwardly therethrough so as to pass in contact with the lower ends of the tube members 18. The heat of said hot gases will be transferred to the tube walls and conducted therethrough to the volatile liquid L with which said lower ends of the tubes are filled. The heat thus transferred to the liquid I, will cause the same to boil and thus produce hot vapors which will rise to the upper ends of the tubes in contact with the walls thereof. The heat from the hot vapors will be transferred to the upper end walls of the tubes and conducted therethrough for radiation therefrom to the ingoing cool air delivered through the conduit 7 to the furnace fire-box, thus raising the temperature of this air. In this manner the temperature of the hot outgoing gases is reduced by transferring the heat thereof to the ingoing air. The radiation of heat from the hot vapors at the upper ends of the tubes, cools the hot vapors so as to effect condensation thereof, whereupon the vapors are returned to liquid form so as to gravitate back to the lower tube ends, this cycle of operations continuing during the flow of outgoing hot and ingoing cool gases through the respective conduits 6 and 7. The flow of outgoing hot gases and ingoing cool air being in opposite directions in the respective conduits 6 and 7, it follows that, as the units A are arranged in stages across the paths of flow, that the coolest tubes will be those at the ends of the conduit passages where the stack gases leave and the cool air comes in, and the hottest tubes will be those at the ends of the conduit passages where the stack gases enter and the air leaves. By virtue of this arrangement the ingoing air will be gradually raised in temperature as it passes to the furnace.

It will be obvious that various arrangements may be resorted to as to the disposition of the conduits 6 and 7, for example, they may be substantially horizontal as shown, or they may be inclined, or even vertical; in the latter case the units would be disposed slantingly sufficient to assure gravitation of the volatile liquid to those ends of the tubes which are disposed in the path of the hot stack gases.

While I have shown and above described a form of my novel heat transfer means which is specifically adapted for use as a furnace air preheater, it will be obvious that other applications of the general principles involved in its novel construction may be made to other forms of apparatus whereby it is desired to either extract heat from a hot fluid, supply heat to a cool fluid, or transfer heat from a moving stream of fluid to an adjacent moving stream of fluid, and that the fluid may be either liquid or gaseous.

It must also be understood that broadly my invention includes the novel tubular heat transfer element per se as a contact heat transfer means without regard to the particular apparatus with which it may be used.

I am aware that some changes may be made in the general construction and arrangement of the heat transfer apparatus above set forth, as well as in the details of the construction of the same without departing from the scope of the instant invention. It is, therefore, to be understood that the specific disclosure of this application is to be considered as illustrative and not in a limiting sense.

I claim:—

1. In a furnace air preheater, the combination with adjacent ducts, one of said ducts serving as a conduit for hot gases of combustion discharged from a furnace and the other as a conduit for delivering fresh air to the furnace firebox, of a heat transfer device comprising a supporting plate, a plurality of hermetically sealed tubes carried by said supporting plate so as to extend above and beneath the latter, means for detachably mounting said supporting plate intermediate said delivery and discharge conduits whereby the lower ends of the tubes carried thereby are disposed in contact with outgoing hot products of combustion and the upper ends of the tubes are disposed in contact with the ingoing fresh air, and a volatile liquid contained in the lower ends of said tubes.

2. In a furnace air preheater, the combination with adjacent ducts, one of said ducts serving as a conduit for hot gases of combustion discharged from a furnace and the other as a conduit for delivering fresh air to the furnace fire-box, of a heat transfer device comprising a supporting plate, a plurality of hermetically sealed tubes carried by said supporting plate so as to extend above and beneath the latter, means for detachably mounting said supporting plate intermediate said delivery and discharge conduits whereby the lower ends of the tubes carried thereby are disposed in contact with outgoing hot products of combustion and the upper ends of the tubes are disposed in contact with the ingoing fresh air, a volatile liquid contained in the lower ends of said tubes, said conduits having an opening for the insertion and withdrawal of said heat transfer device, and an exterior cover plate to close said opening.

3. In a furnace air preheater, the combination with adjacent ducts, one of said ducts serving as a conduit for hot gases of combustion discharged from a furnace and the other as a conduit for delivering fresh air to the furnace fire-box, of a heat transfer device comprising a supporting plate, a plurality of hermetically sealed tubes carried by said supporting plate so as to extend above and beneath the latter, means for detachably mounting said supporting plate intermediate said delivery and discharge conduits whereby the lower ends of the tubes carried thereby are disposed in contact with outgoing hot products of combustion and the upper ends of the tubes are disposed in contact with the ingoing fresh air, a volatile liquid contained in the lower ends of said tubes, said conduits having an opening for the insertion and withdrawal of said heat transfer devices, an exterior cover plate to close said opening, an interior cover plate, a partition plate connected with said interior cover plate, means for detachably coupling said interior cover plate with said heat transfer device whereby withdrawal of the latter moves said interior cover plate and said partition plate into operative relation to the said conduits.

4. In a furnace air preheater, the combination with adjacent ducts, one of said ducts serving as a conduit for hot gases of combustion discharged from a furnace and the other as a conduit for delivering fresh air to the furnace fire-box, of a heat transfer device comprising a supporting plate, a plurality of hermetically sealed tubes carried by said supporting plate so as to extend above and beneath the latter, means for detachably mounting said supporting plate intermediate said delivery and discharge conduits whereby the lower ends of the tubes carried thereby are disposed in contact with outgoing hot products of combustion and the upper ends of the tubes are disposed in contact with the ingoing fresh air, a volatile liquid contained in the lower ends of said tubes, and a packing means carried by said supporting plate so as to be interposed between said conduit passages and around the intermediate portions of said tubes adjacent to said supporting plate.

5. In a furnace air preheater, the combination with juxtaposed conduits one of which serves as a passage for hot gases discharged from a furnace and the other as a passage for fresh air entering the furnace fire-box, of a series of heat transfer devices arranged in said juxtaposed conduits with their lower ends in said discharge conduit and their upper ends in said delivery conduit, each heat transfer device comprising a supporting plate, a plurality of hermetically sealed tubes carried by and extending through said supporting plate, means for detachably mounting said supporting plates intermediate said juxtaposed conduits, and a volatile liquid contained in the lower ends of said tubes.

6. In a furnace air preheater, the combination with juxtaposed conduits one of which serves as a passage for hot gases discharged from a furnace and the other as a passage for fresh air entering the furnace fire-box, of a series of heat transfer devices arranged in said juxtaposed conduits with their lower ends in said discharge conduit and their upper ends in said delivery conduit, each heat transfer device comprising a supporting plate, a plurality if hermetically sealed tubes carried by and extending through said supporting plate, means for detachably mounting said supporting plates intermediate said juxtaposed conduits, and a volatile liquid contained in the lower ends of said tubes, said conduits having openings for the insertion and withdrawal of said heat transfer devices, exterior cover plates to close said openings, interior cover plates, partition plates respectively connected with said interior cover plates, means for detachably coupling said interior cover plates with said heat transfer devices whereby withdrawal of the latter moves said interior cover plates and partition plates into operative relation to said conduits.

In testimony, that I claim the invention set forth above I have hereunto set my hand this 30th day of June, 1927.

FRAZER W. GAY.